US006179006B1

(12) United States Patent
Stoll et al.

(10) Patent No.: US 6,179,006 B1
(45) Date of Patent: Jan. 30, 2001

(54) PLATE-TYPE MOUNTING BASE

(75) Inventors: Kurt Stoll; Dieter Beyer, both of Esslingen (DE)

(73) Assignee: Festo AG & Co., Esslingen (DE)

( * ) Notice: Under 35 U.S.C. 154(b), the term of this patent shall be extended for 0 days.

(21) Appl. No.: 09/380,872

(22) PCT Filed: Mar. 3, 1998

(86) PCT No.: PCT/EP98/01170

§ 371 Date: Sep. 8, 1999

§ 102(e) Date: Sep. 8, 1999

(87) PCT Pub. No.: WO98/41766

PCT Pub. Date: Sep. 24, 1998

(30) Foreign Application Priority Data

Mar. 18, 1997 (DE) ........................................ 197 11 227

(51) Int. Cl.7 ........................................ F16K 11/00

(52) U.S. Cl. ........................................ 137/884; 137/269

(58) Field of Search ........................................ 137/884, 269

(56) References Cited

U.S. PATENT DOCUMENTS 3,111,139 11/1963 Beckett et al. .
3,589,387 * 6/1971 Raymond ........................ 137/261
4,170,214 * 10/1979 Gill et al. ........................ 137/269
5,301,717 * 4/1994 Goedecke ........................ 137/884

FOREIGN PATENT DOCUMENTS 22 64 091 A1 7/1973 (DE) .
28 12 927 A1 10/1979 (DE) .
42 22 637 A1 1/1994 (DE) .
42 29 054 A1 3/1994 (DE) .
44 13 657 C1 11/1995 (DE) .
0 002 187 A1 6/1979 (EP) .

* cited by examiner

*Primary Examiner*—John Fox
(74) *Attorney, Agent, or Firm*—Hoffman & Baron, LLP

(57) ABSTRACT

A tabular assembly base (2) is proposed, which serves for the detachable fitting of a valve unit (3). The assembly base (2) is modular in design and comprises a plurality of individual base segments (23) joined together as a rigid unit. The valve unit (3) comprises several valve modules (4). Underneath the base segments (23) several connection segments (25) are located which are associated with the valve modules (4). They possess load ducts (33) communicating with the valve modules (4) and having an electrical and/or fluid power functional unit (38) associated with them at least in part.

20 Claims, 2 Drawing Sheets

PLATE-TYPE MOUNTING BASE

BACKGROUND OF THE INVENTION

1. Field of the Invention

The invention relates to a tabular assembly base for the detachable mounting of a valve unit, in which several valve modules are placed together as an assembly group, load ducts, adapted to be connected with loads to be controlled, being formed in the assembly base, such load ducts being associated in groups with different valve modules of the valve unit and communicating with power ducts of the respectively associated valve module when the valve unit is mounted.

1. Description of the Prior Art

The German patent publication 4,413,657 C1 discloses a valve unit composed of several valve modules placed in a row together with terminally arranged terminating modules, which are collected together with the formation of a unit. The necessary connections with the loads to be driven are produced by connecting pressure medium lines which lead to the loads, by power fluid ducts, which open at the lower side of the unit, directly with the respective valve modules.

Alternatively to this a connection of the loads using a plate-like "pneumatic multi-pole" as a tabular assembly base as sold by the assignee. In this respect it is a question of a plain plate, on which the previously assembled valve unit is attached bodily in a detachable fashion. The pressure medium lines leading to the loads are in this case connected with the assembly base so that in case of need the valve unit may be removed without the pressure medium lines having to be removed separately. Furthermore the supply and removal of the pressure medium required for the operation of the valve modules, as for example compressed air, can be via the assembly base.

However it has turned out that the known pneumatic multipole designed in the form of a plain plate is not always able to do justice to the ever increasing requirements as regards flexibility and adaptability. Thus, dependent on the number of the valve modules, assembly bases with different dimensions required. This makes it necessary to take many different measures as regards stockholding and logistics, which are not without effect on the costs of manufacture. Furthermore, the operator of the valve unit as well must completely replace the tabular assembly base if the unit is to be further developed.

OBJECTS AND SUMMARY OF THE INVENTION

One object of the invention is consequently to create a tabular assembly base of the type initially mentioned, which while reducing costs of manufacture renders possible substantially more flexible and adaptable application.

In order to achieve this object the assembly base is in a modular manner composed of a plurality of individual base segments joined together as a rigid unit, such units including a plurality of connection segments associated with at least one valve module and having at least one group of load ducts, such connection segments being at least partially fitted with at least one electrical and/or fluid power functional unit associated with a load duct.

Accordingly the invention contemplates an assembly base which still has plate-like rigid properties and may be employed as a fluid power multipole. However as compared with the prior art there are substantially better possibilities of universal application, since individual assembly of the assembly base is possible as an adaptation to the associated valve unit. Subsequent enlargement of the valve unit can take place without any difficulty by suitable further additions to the assembly base with a suitable number of connection segments. Stockholding and logistics complexity in connection with the manufacture of the assembly base is considerably reduced, since on the basis of a certain number of standardized connection segments a large number of different assembly bases may be produced. It has further turned out that functionality may be increased in an extremely simple fashion as well using the modularly designed assembly base. Thus it is possible for connection segments to be individually or jointly provided with electrical and/or fluid power functional units, which cooperate with one or more of the load ducts extending in the associated connection segment in order in the desired manner to influence the supply of pressure medium to the connected load, to monitor such supply of pressure medium or cause some desired function to be performed in a manner dependent on the supply of pressure medium. Only one connection segment must be installed, which has the desired functional unit, substitution or addition of suitably fitted connection segments being possible if required later. The invention thus provides an assembly base which is extremely adaptable and flexible not only as regards the mechanical aspect in relation to the structure but also as regards functionality.

Advantageous further developments of the invention are recited in the claims. The selection of the functional units to be employed is practically unlimited. Thus for instance plain fluid power functional units such as check valves, pressure controllers or so-called choke check valves, that is to say combinations of a choke and a check valve, can be employed. As electrical functional units—the term "electrical" also the being understood to mean electronic structures—pressure detection units would be possible for example, which operate on the basis of a p/e transducer and may be employed as pressure switches, which when certain pressure level is reached—in the case of vacuum applications as well—produce signals which may be further processed, as for instance for controlling the valve unit or at least the valve module associated with it. Purely electrical interrogation functions are naturally also possible.

A particularly compact structure is produced if the all or at least some of the functional units are integrated in the associated connection segment or installed therein.

The connection segments may if necessary be so designed that, in the assembled state of the valve unit thereon, only one module or simultaneously several adjacently placed modules are arranged of them. In this case there is also the possibility of associating a single group of load ducts with a common connection segment, such ducts then having a larger cross section in order to allow for higher flow rates.

At a position which is at the end in terms of the direction of assembly, it is possible to provide base segments, which are designed in the form of coupling segments and render possible the coupling up of further groups of components, the possibility of coupling further elements not necessarily being limited to assembly bases in accordance with the invention.

It is furthermore an advantage to provide a terminal segment at the end of the row of connection segments and—in the case of the presence of coupling segments—between the arrangement of the connection segments and a respective coupling segment, such terminal segment being fitted with supply and/or discharge ducts, which when the valve unit is mounted communicate with supply and venting ducts, which are formed in one or two connection modules of the valve unit and are supplied via the valve modules with pressure medium or via which the vented air coming from the loads and any pilot valves may be discharged.

A particularly simple structure is produced if the individual base segments of the assembly base are braced together by means of ties extending in the direction of assembly so that if required there is the possibility of replacing individual connection segments, of adding extra connection segments or removing any connection segment, which is no longer required.

The invention will be described in detail with reference to the accompanying drawings.

DETAILED DESCRIPTION OF THE INVENTION

Figure 1:
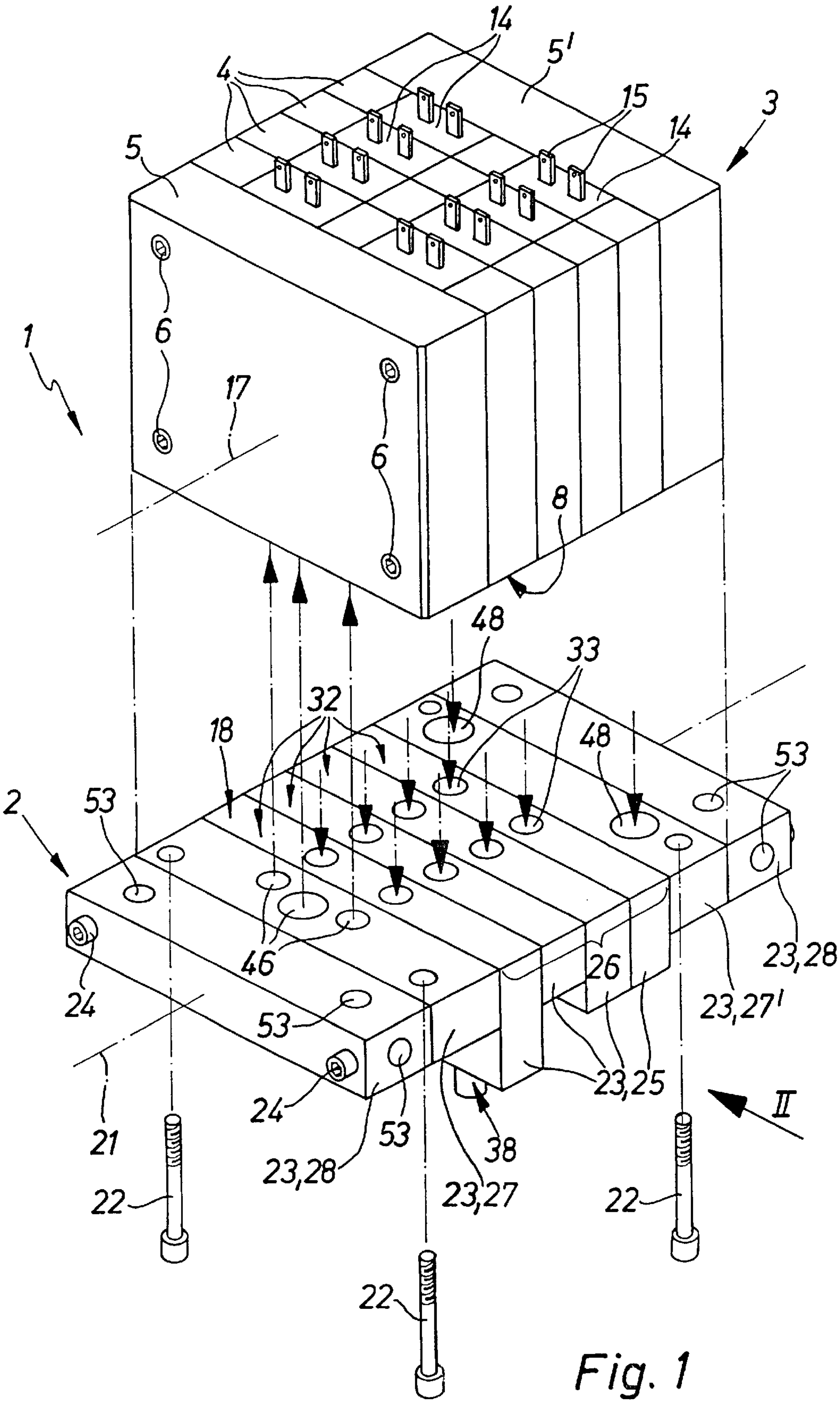
FIG. 1 shows a constructional unit made up of an assembly base and a valve unit in perspective.
Figure 2:
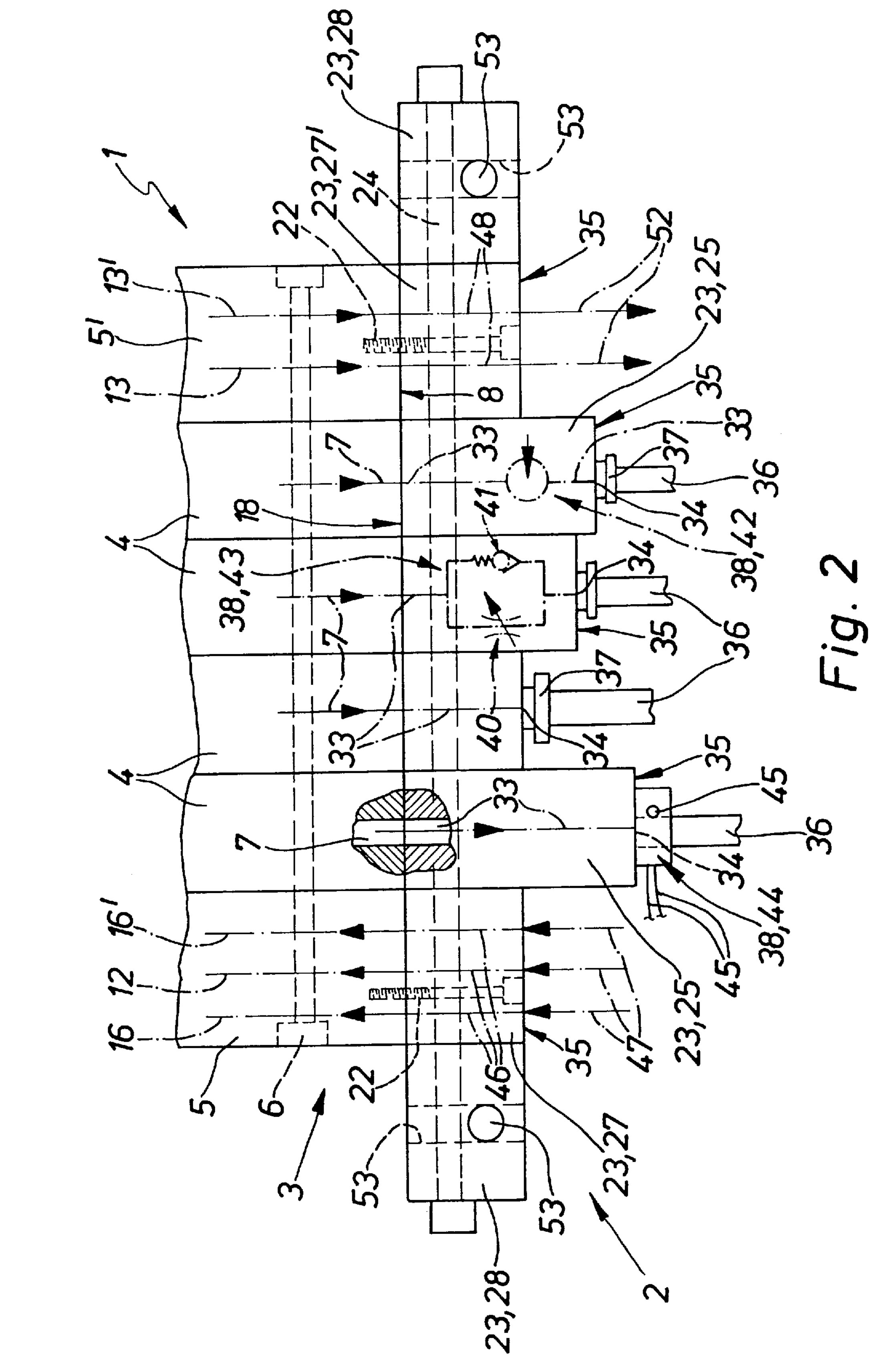
FIG. 2 is a lateral view of the arrangement of FIG. 1 with the valve unit the valve unit, which is only illustrated in part, in position, looking in the direction of the arrow II of FIG. 1.

FIGS. 1 and 2 show a valve arrangement 1, which is made up of a tabular or plate-like assembly base 2 and a block-like valve unit 3.

The valve unit 3 possesses a plurality of tabular valve modules 4 of which in the working example four are present. These valve modules 4 are placed side by side with the planes of the plate parallel to one another. The first and the last valve module 4 are flanked on the side opposite to the other valve modules by a terminating and also tabular module 5 and 5' so that the row of valve modules 4 is arranged between the two terminating modules 5 and 5'. The entire module arrangement is braced together as a block-like unit, FIG. 1 showing the ends of several ties 6, which act on the two terminal modules 5 and 5' and thus brace same together in the direction of the row of the modules in such a manner that intermediately placed valve modules 4 are firmly clamped. The valve unit 3 is able to be handled as a single body.

The structure of the individual valve modules 4 may be of any suitable form. However all the modules comprise at least one fluid power ducts 7, there being two such ducts in the working example, opening on the assembly side 8 facing the assembly base 2 of the respective valve module 4.

At their side facing away from the opening the fluid power ducts 7 communicate within the associated valve module 4 with a valve spool receiving space, not illustrated, wherein a valve spool is arranged able to be reciprocated between two positions of switching. Dependent on the position of switching of the valve spool the fluid power ducts 7 are respectively connected either with a feed duct 12 or with a venting duct 13 and 13'. The switching over operation is caused by pilot valves, each valve module 4 being fitted with one and preferably two such pilot valves. The pilot valve are electrically driven—it being a question of so-called solenoid valves, two electromagnets being indicated in FIG. 1 for each valve module 4 as applying for each pilot valve.

During operation the electromagnets 14 are provided with electrical drive signals in a selected sequence, this taking place using electrical leads (not illustrated in detail), which are able to be connected with the connection lugs 15 indicated in FIG. 1, the respectively operated electromagnet 14 opening a pilot valve so that a fluid pilot control medium, more particularly compressed air, supplied via pilot control ducts 16 and 16' reaches the associated valve spool, same then changing into its switching position.

The above described simplified structure, of the valve modules 4 is described in more detail in the German patent publication 4,413,657 C1, which is incorporated herein by reference so that no further details must be provided thereof.

The supply duct 12, the pilot ducts 16 and 16' and the venting ducts 13 and 13' respectively begin in one of the terminating modules 5 and 5', toward whose assembly surface 8 turned toward the assembly base 2 they open. Starting at the opening they extend in the interior of the associated terminating module 5 and 5' in order to finally pass through the complete row of valve modules 4 in the direction 17 in which they are assembled and to communicate with the valve spool receiving space. In the illustrated working embodiment the arrangement is so designed that the supply duct 12 and the two pilot ducts 16 and 16' terminate at the assembly surface 8 of the front terminal module 5 and the two venting ducts 13 and 13' end at the assembly surface 8 of the rear terminating module 5'. However a different arrangement of the openings would be possible and for example all the above mentioned ducts could open in one and the same terminating module.

The supply duct 12, the venting ducts 13 and 13' and the pilot ducts 16 and 16' are only indicated in chained lines in FIG. 4 for the sake of simplicity.

The assembly base 2 of the valve arrangement 1 possesses a tabular configuration. At the side facing the valve unit 3 it defines a flat mounting surface 18. The valve unit 3 may be mounted thereon with its mounting face 8 in contact therewith. For the attachment of the valve unit 3 after placing it in position use is made of suitable attachment means 22, which for example are in the form of attachment screws and accordingly render it possible to brace or clamp the assembly base and the valve unit 3 detachably together.

The assembly base 2 is modular in design and is composed of a plurality of separate base segments 23, which are placed together in a stacking direction 21 parallel to the direction 17 of assembly to constitute a rigid unit. The rigid coherence is ensured by a plurality of connecting elements 24, which for example are in the form of anchoring ties, which extend through the row of base segments 23 parallel to the direction 21 of stacking and are anchored at the two terminal base segments 23.

The assembly base 2 comprises different types of base segments 23. There is one group of directly adjacent sequential connection segments 25, the respective connection segment arrangement 26 being flanked at both of the ends turned in the direction 21 of stacking by a terminal segment 27 and 27', which for its part is flanked on the side, which is opposite to the connection segment arrangement 26, by a coupling segment 28 constituting the end of the base segments 28.

In the illustrated working embodiment the number of the connection segments 25 is the same as the number of valve modules 4. Furthermore the width as measured in the stacking direction 21 of each connection segment 25 is the same as the suitably measured width of the associated valve module 4. At the side of the mounting surface 18 each connection segment 25 defines an assembly area 32, on which the associated valve module 4 is seated on the assembly surface 8 when valve unit 3 is mounted.

Each connection segment 25 has a group of load ducts 33, each duct group having at least one and in the example two load ducts. The load ducts 33 of the respective connection segment 25 open at the associated mounting area 32 in such a manner that their openings and the openings of the power ducts 7 of the associated valve module 4 are aligned in pairs. This means that one respective power duct 7 of a valve module 4 merges into a load duct 33 of the associated connection segment 25. In order seal off the transition a suitable sealing means is put in between details of which are however omitted from the drawing. Each load duct 33 extends through the associated connection segment 25 and opens at a connection opening 34 (outside the mounting area 32) at the outer surface of the respective connection segment 25. It has been found convenient for the connection openings to be so placed that they are on the side, which is opposite to the associated mounting area 32 of the connection segment 25. The corresponding surface of the connection segment 25 is here referred to as the connection surface 35, it facing in the same direction as the mounting area 8 when the valve unit 3 is in place, that is to say downward.

Via the connection openings it is then possible for any load, and more particularly a fluid power load, to be connected, such load for example being a pressure medium operated cylinder. The connection is produced using intermediate and more particularly flexible pressure medium lines 36, which at one end are connected with the load and at the other with one of the connection openings 34. The connection with the connection opening 34 may for instance be performed by screwing the pressure medium line directly in or being connected using a connection device 37, which for its part is secured at the connection opening to the connection segment 25. As a connection the device 37 it may for example be a question of a plug connection means anchored on the connection segment, into which the respective pressure medium line 36 can be plugged in a detachable sealing fashion.

While in the embodiment of the invention each valve module 4 has its own connection segment 25 provided for it, differently designed structures are also possible, in the case of which one or more connection segments 25 are present, which have two or more mounting areas and which, when the valve unit 3 is in place, may be simultaneously fitted with a plurality of valve modules 4. In this respect it is furthermore possible for each valve module 4 to have its own group of load ducts 33. However it is possible for a plurality of valve modules 4 to be associated jointly with a single group of load ducts, it then being convenient for the flow cross section of the load ducts 33 to be made larger in order in this manner to control larger flows.

It is furthermore possible to provide the connection openings 34 of a plurality of connection segments 25 with different connection sizes and for example to have connection screw threads having different standards. It is in this manner that by the selective employment of suitably fitted connection segments 25 it is possible to customize an assembly base in an individual manner.

A further increase in the range of variability of the structure of the assembly base 2 is possible if at least a part of the connection segments present is provided with an electrical and/or fluid power functional unit 38 associated with a load duct 33. Same then cooperate with the pressure medium (the term pressure medium also being employed in the sense of vacuum) flowing in the load duct, different effects being produced in accordance with the function. In the illustrated working embodiment there is the further aspect that the functional units 38 present are integrated in the respectively associated connection segment 25 and are incorporated respectively in the housing of the respective connection segment 25. The functional units 38 are indicated in chained lines in FIG. 3 for the sake of simplification.

It is quite possible to associate load ducts 33 extending in one connection segment 25 with different functional units 38. In the working embodiment the arrangement is such that the load ducts 33 within the individual connection segments 25 share the same functional unit 38. In the following the functional units 38 employed will be described in brief.

Starting at the right in FIG. 2 a functional unit 38 termed a pressure regulator 42 is placed on each load duct 33 of the first connection segment 25. It renders possible a setting of the fluid pressure available at the connection opening 34 as may be required.

As a functional unit the next connection segment 25 comprises a choke check valve 43, that is to say a combination of a choke and a check valve 41 preventing flow in the outward direction. The choke 40 is preferably adjustable so that outwardly flowing pressure medium may be choked as may be required.

The adjoining connection segment 25 does not have any functional unit 38. It only has two load ducts 33 extending through it, which do not in any way cooperate with a functional unit 38.

The fourth connection segment 25 possess a combined electrical and fluid power functional unit 38 in the form of a pressure detection unit 44. It operates on the basis of a p/e transducer, the detected pressure being converted into electrical signals, which may be supplied via electrical leads 45 to a further processing means, as for example in the form of an electronic control means, which controls the operation of the valve unit 3. Further the pressure detection unit 44 has an indicating element 45, which is tripped, when a certain pressure is detected in the associated load duct 33.

The pressure detecting unit 44 may for example be a so-called pressure-sensitive switch, as is employed in vacuum applications in order to operate a vacuum producing means, when vacuum in an associated load duct 33 falls below a given level. In the case of such an application the valve module 4 can be a vacuum module, in which a vacuum producing means, for instance of the ejector type, is integrated.

It will be clear that purely electrical functional units 38 may be provided, this term also including electronic functional units.

In fact owing to the modular design of the assembly base 2 it is possible for any desired type of connection segments to be coupled together, connection elements being able to be employed in any desired order with certain functional units 38 as may be required.

When the valve unit 3 is mounted in place the two connection the modules 5 and 5' are seated on one respective terminal segment 27 and 27'. Then the supply duct 12 formed in the one terminal module 5 and the pilot ducts 16 and 16' communicate with supply ducts 46 extending through the associated terminal segment 27. Pressure medium lines 47 may be detachably connected at the openings, present in the opposite connection surface 35, of these supply ducts 46, via which lines the operating pressure medium and the pilot pressure medium can be supplied.

The opposite terminal segment 27' possesses two venting ducts 48, which, when the valve unit 3 is mounted, communicate with the venting ducts 13 and 13' in the associated connection module 5'. At their openings present in the connection surface 35 it is also possible for pressure medium lines 52 to be connected, which allow the spent air to escape. Alternatively it would also be possible to provide a silencer here as well.

The plane defined by the terminal segments 27 and 27' and the connection segments 25 is best the same as that of the valve unit 3. The coupling segments 28 accordingly project in the direction of assembly past this plane and thus past the valve unit 3. They render possible the coupling of further components and more particularly one or more assembly bases of further comparable valve arrangements 1. For simplification of coupling the coupling segments 28 have several more specially through holes extending in the longitudinal of the respective coupling segment 28 and/or athwart same at a right angle to the mounting surface 18.

In connection with the terminal segments 27 and 27' it is furthermore to be noted that the ducts extending therein do not have to open at the connection side 35 and the openings could for example also be at the respective terminal segment 27 and 27'.

The assembly base segments 23 are generally like plates or rails so that in the assembled state they snugly bear against one another and form an extremely firm assembly base 2.

What is claimed is:

1. A valve arrangement comprising a plurality of valve modules which are detachably mounted on a tabular assembly base, the assembly base including load ducts formed therein which communicate with load ducts of the valve modules, said assembly base being modular and comprising a plurality of individual base segments stacked in a row as a rigid unit, a load duct of at least one base segment being in fluid communication with at least one functional unit and wherein the valve modules are stacked in a row of subassemblies to form a valve unit able to be handled as a uniform body, which is detachably mounted on the tabular assembly base.

2. The valve arrangement as claimed in claim 1, wherein at least one functional unit comprises a check valve.

3. The valve arrangement as claimed in claim 1 wherein at least one functional unit comprises a combination of at least one adjustable choke valve and at least one check valve.

4. The valve arrangement as claimed in claim 1, wherein at least one functional unit comprises a pressure regulator.

5. The valve arrangement as claimed in claim 1, wherein at least one functional unit comprises a pressure detecting unit.

6. The valve arrangement as claimed in claim 1, wherein the assembly base further includes a plurality of connection segments having different connection sizes for pressure medium lines connected to the load ducts of the assembly base.

7. The valve arrangement as claimed in claim 1, wherein at least one base segment has several valve modules associated with it when the valve unit is mounted.

8. The valve arrangement as claimed in claim 1, wherein the row of base segments is flanked at either end by a terminal segment having at least one duct formed therein and the row of valve modules is flanked at either end by a terminating module having at least one duct formed therein, at least one duct of the terminal segment being in fluid communication with at least one duct of the terminating module when the valve unit is mounted to the assembly base.

9. The valve arrangement as claimed in claim 1, wherein the row of base segments terminates on at least one end with a coupling segment which renders possible the coupling up of further components.

10. The valve arrangement as claimed in claim 1, wherein the base segments are braced together by means of ties extending in the direction of assembly.

11. A valve assembly comprising:

a plurality of valve modules coupled together in a row to form a valve unit, each valve module having at least one fluid duct formed therein; and a plurality of base segments coupled together in a row to form an assembly base having a mounting face, each base segment having at least one fluid duct formed therein, wherein the valve unit is detachably mounted to the mounting face of the assembly base such that at least one fluid duct of each valve module is in fluid communication with a fluid duct of a base segment.

12. The valve assembly as defined in claim 11, wherein the assembly base further includes at least one functional unit connected to a duct of a base segment at a surface opposite the mounting face of the assembly base.

13. The valve assembly as defined in claim 12, wherein the functional unit comprises a check valve.

14. The valve assembly as defined in claim 12, wherein the functional unit comprises a combination of at least one adjustable choke and at least one check valve.

15. The valve assembly as defined in claim 12, wherein the functional unit comprises a pressure regulator.

16. The valve assembly as defined in claim 12, wherein the functional unit comprises a pressure detecting unit.

17. The valve assembly as defined in claim 11, wherein the assembly base further includes connectors for connection to pressure lines, the connectors being connected to the ducts of the base segments at a surface opposite the mounting face of the assembly base.

18. The valve assembly as defined in claim 11, wherein the assembly base further includes a terminal segment connected to an end of the row of base segments, the terminal segment having a duct formed therein, and the valve unit further includes a terminating module connected to an end of the row of valve modules, the terminating module having a duct formed therein which is in fluid communication with a duct of an adjacent valve module, wherein the duct of the terminal segment is in fluid communication with the duct of the terminating module when the valve unit is mounted to the assembly base.

19. The valve assembly as defined in claim 11, wherein the assembly base further comprises a coupling segment connected to an end of the row of base segments, the coupling segment being connectable to further components.

20. The valve assembly as defined in claim 11, wherein the base segments are connected together by screws.

* * * * *